T. L. ROBINSON.
APPARATUS FOR SEPARATING FISH OIL FROM WATER, AND OTHER IMPURITIES.
No. 47,333. Patented Apr. 18, 1865.
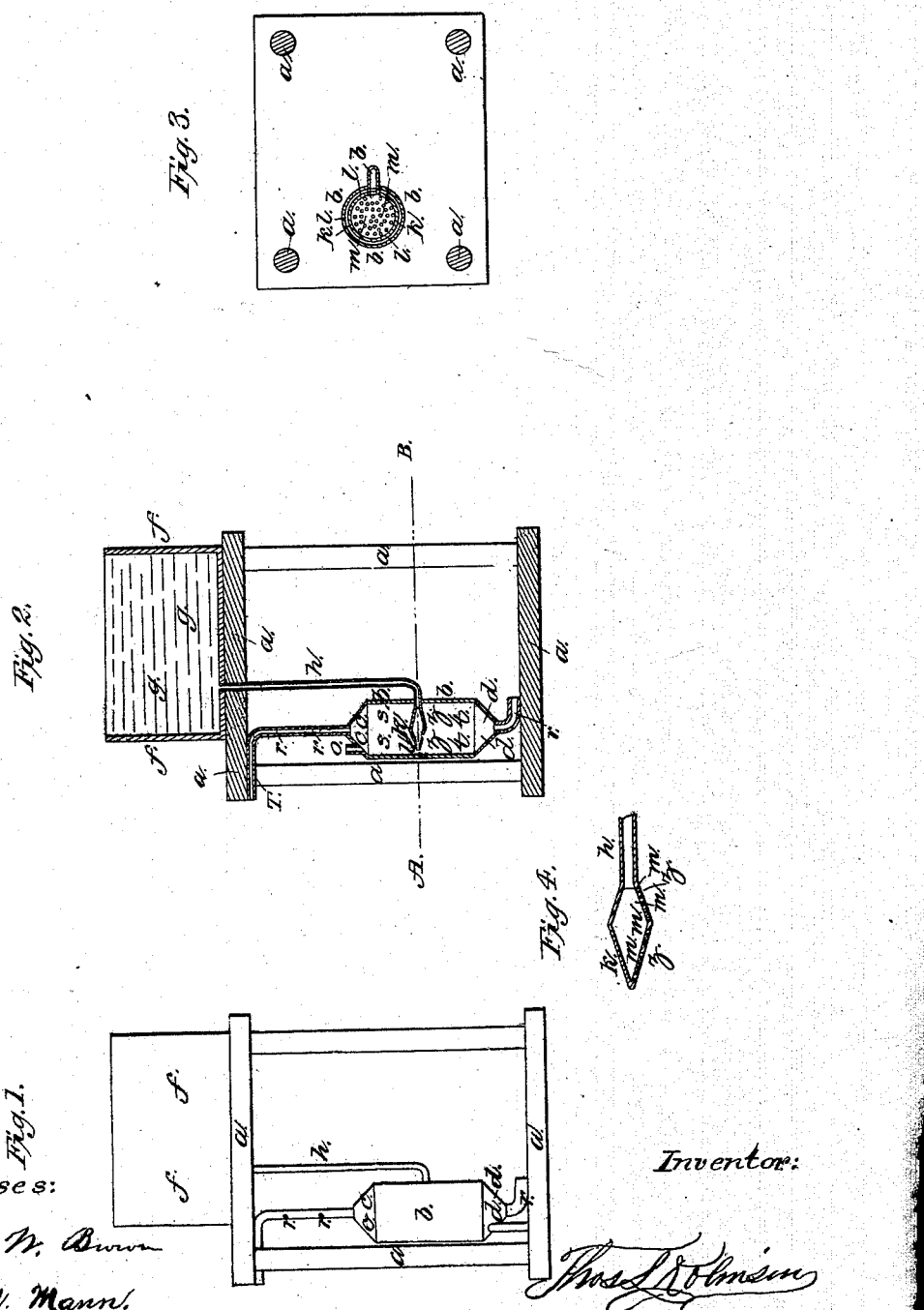

UNITED STATES PATENT OFFICE.

THOMAS L. ROBINSON, OF BOSTON, MASSACHUSETTS.

IMPROVEMENT IN APPARATUS FOR SEPARATING FISH-OIL FROM WATER AND OTHER IMPURITIES.

Specification forming part of Letters Patent No. 47,333, dated April 18, 1865.

*To all whom it may concern:*

Be it known that I, THOMAS L. ROBINSON, of Boston, in the county of Suffolk and State of Massachusetts, have invented a certain new and useful Apparatus for Defecating and Skimming Fish and other Oils; and I do hereby declare that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

In the extraction of oil from fish by pressure or by any other proper means water and other liquids, together with extraneous and refuse matters, necessarily become mixed therewith, which, before the oil is suitable for use, must be entirely separated therefrom. Heretofore this has been partially accomplished by hand-skimming the oil from the surface of the water, the mixture having first been allowed to settle; and as the water and refuse matters have a greater specific gravity than the oil, they necessarily collect together in the bottom of the tank or receptacle used. The oil, as fast as thus skimmed, is then placed in another tank or other suitable vessel, into which clean and pure water is caused to flow for the purpose of more thoroughly defecating and purifying the oil of all remaining impurities before being used. The admixture is then allowed again to settle, after which the oil is removed therefrom, as before; but these operations are, as is readily apparent, slow and tedious, and besides expensive and disadvantageous, and therefore the present invention has for its object, and which is accomplished thereby, the automatic purification and separation of the oil extracted from fish from all impurities contained therein.

I accomplish this result by the use of a cylindrical or any other suitable shaped vessel or tank closed at both ends and placed in a vertical position. Into this cylinder or vessel the oil, as fast as extracted from the fish, is fed through any suitable pipe and then allowed to settle. The water and other refuse liquids and matters contained therein, settling at the bottom, are then drawn off through a pipe, after which pure and clean water is admitted to the same vessel, and mixing with and thoroughly penetrating the oil cleanses and purifies it of all remaining impurities, and finally, settling at the bottom of the vessel, gradually lifts the oil in the same and causes it to be delivered and flow out at any suitable outlet at or near the top of the vessel properly prepared for immediate use.

From the above description it will be seen that in lieu of removing the oil from one vessel to another, as has heretofore been necessary in the ordinary methods practiced for the separation and purification of fish-oil from refuse matters and liquids, the whole operation is performed in one and the same vessel without removal therefrom until ready for use, the many advantages of which are evident and need no particular mention herein.

I have also made other improvements in the construction and detail operation of the apparatus, which will be hereinafter more particularly described.

Having thus described my new apparatus in general terms, I will now proceed to describe the same in detail, reference being had to the accompanying plate of drawings, of which—

Figure 1 is a side view; Fig. 2, a central longitudinal vertical section; Fig. 3, a horizontal transverse section taken in plane of line A B, Fig. 2, and Fig. 4 a detail sectional view.

$a$ $a$ in the accompanying drawings represent the supporting frame-work of the apparatus; $b$ $b$, a cylindrical-shaped vessel or tank placed in a vertical position within the frame-work $a$ $a$, and having its two ends closed and made of a conical shape, as represented at $c$ $c$ and $d$ $d$, for a purpose to be hereinafter specified; $f f$, a water-tank placed above the vessel $b$ $b$, containing water, $g$ $g$, as represented in the drawings; $h$ $h$, a pipe passing from the tank $f$ and entering the cylinder $b$ at or near the central portion thereof. This pipe $h$ terminates in a double conical-shaped nozzle, $k$, placed horizontally within the said vessel $b$, of a little less diameter than the said vessel, leaving a space, $l$ $l$, around the same between it and the vessel. The lower side of the nozzle $k$ is perforated with a series of apertures, $m$ $m$, &c., forming a sprinkler, $z$, for the delivery of the water to the vessel $b$.

Into the vessel $b$ $b$ the oil, as extracted from fish, is fed through the pipe $o$ $o$ at the top thereof, and is then allowed to settle, the water and other liquids and extraneous matters contained in the oil settling at the bottom of the vessel, from which they are then drawn off through a pipe, $p\ p$. Into the vessel $b\ b$, now containing only the oil, pure and clear water is forced from the tank $f\ f$ through the said pipe $h$ and sprinkler $z$, and thereby, thoroughly penetrating all portions of the oil, still further purifies it, and finally causes it gradually to be raised within the vessel $b$, from which it is delivered at the top thereof, through the pipe $r\ r$, into any proper vessel or vessels made to receive it.

From the above description it is evident that the automatic purification of fish-oil is accomplished, and in one and the same apparatus—a result never before secured.

After the oil has been all delivered from the oil-vessel $b\ b$, as described, the water contained in the vessel $b$ is then drawn off through the pipe $p$, when the apparatus is again ready for use.

By forming the ends or heads of the oil-vessel $b\ b$ of a conical shape, as described, and represented in the drawings, the adhesion of oil and extraneous matters and liquids to the same is prevented and their ready flowage therefrom obtained, which would not be the case were they made of a flat shape, or nearly so. By the use of the conical-shaped nozzle at the delivery end of the water-pipe the adhesion of oil, &c., thereto is also prevented, the said nozzle also serving as a partition and dividing the vessel $b$ into two chambers, $s\ s$ and $t\ t$, communicating with each other through the space $l\ l$, before referred to, which thereby prevents the violent upward agitation of the oil within the vessel $b$ by the force of the water delivered to the lower chamber, $t\ t$, through the sprinkler $z$.

It is evident that by the use of the sprinkler $z$ for the delivery of water to the oil a more thorough and general penetration of the oil by the water is secured, and consequently a correspondingly greater purification thereof.

It is also evident that, although I have particularly described my apparatus in this specification as being adapted to the purification of fish-oil, it can be readily adapted to any oils of whatsoever nature in the purification of which substantially the same process is used as has been hereinbefore described for fish-oil.

What I claim as my invention, and desire to have secured to me by Letters Patent, is—

1. Automatically separating and purifying oils from all extraneous matters and liquids contained therein by means of an apparatus arranged and operating substantially as herein described.

2. Forming the oil-vessel $b\ b$ with heads or ends of a conical shape, substantially as described, and for the purpose specified.

3. The use of the peculiar-shaped nozzle or sprinkler $z$ for the delivery of water to the oil-vessel $b$, arranged and operating substantially as described, and for the purposes specified.

4. Dividing the oil-vessel $b\ b$ into two or more chambers having communication with each other, for the purpose of preventing the violent upward agitation of the oil, substantially as described.

5. The apparatus herein described for separating and purifying oils from extraneous and refuse matters and liquids, the same consisting of the double-headed conical-shaped vessel $b\ b$, oil-pipes $o\ o$ and $r\ r$, water-pipes $h$ and $p$, and sprinkler $z$, or their equivalents, the whole being arranged together and operating substantially as described.

THOS. L. ROBINSON.

Witnesses:
ALBERT W. BROWN,
GEORGE W. MANN.